United States Patent [19]
Walters

[11] 4,235,105
[45] Nov. 25, 1980

[54] HYDRAULIC ACTUATOR CONTROLS

[75] Inventor: Ronald B. Walters, Wembley, England

[73] Assignee: Sperry Corporation, Troy, Mich.

[21] Appl. No.: 41,254

[22] Filed: May 21, 1979

[30] Foreign Application Priority Data

May 26, 1978 [GB] United Kingdom ............... 23324/78

[51] Int. Cl.³ .............................................. G01F 1/22
[52] U.S. Cl. ................................................ 73/861.53
[58] Field of Search .......................... 73/207, 210, 211

[56] References Cited

U.S. PATENT DOCUMENTS

| | | | |
|---|---|---|---|
| 2,941,401 | 6/1960 | Streeter | 73/210 |
| 3,252,324 | 5/1966 | Steele | 73/210 |
| 4,112,757 | 9/1978 | Hayward | 73/207 |

*Primary Examiner*—Herbert Goldstein
*Attorney, Agent, or Firm*—Barnes, Kisselle, Raisch & Choate

[57] ABSTRACT

A fluid flow sensor comprises a hollow spool (58) displaceable on a spindle (66) against a spring (68). A sharp peripheral edge of a peripheral bead (80) on the spool (58) co-operates with the wall (61) of a throat (60) to form an annular flow path between chambers (92 and 90) in a housing (28) as the spool is displaced by the fluid pressure difference between the chambers (92 and 90). In the illustrated resting position of the spool (58), the peripheral bead (80) seats against a valve seat (57) and a residual flow path between the chambers (90 and 92) is provided by a small bleed orifice (89) in the wall of the spool. The pressure difference between the chambers (92 and 90) provides a measure of the fluid flow rate over a very wide range of flow rates.

In a modification, the bleed orifice is pre-adjustable.

5 Claims, 4 Drawing Figures

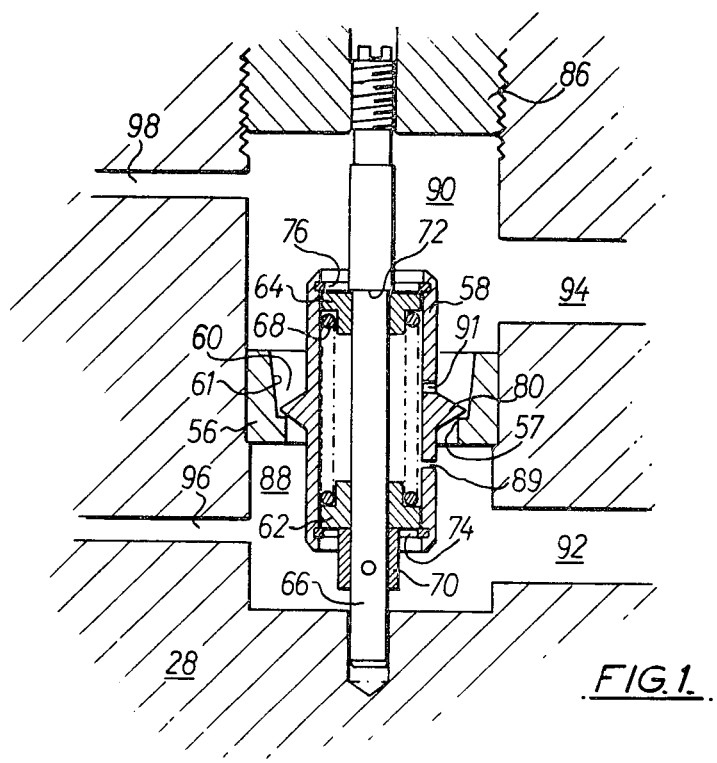
FIG. 1.
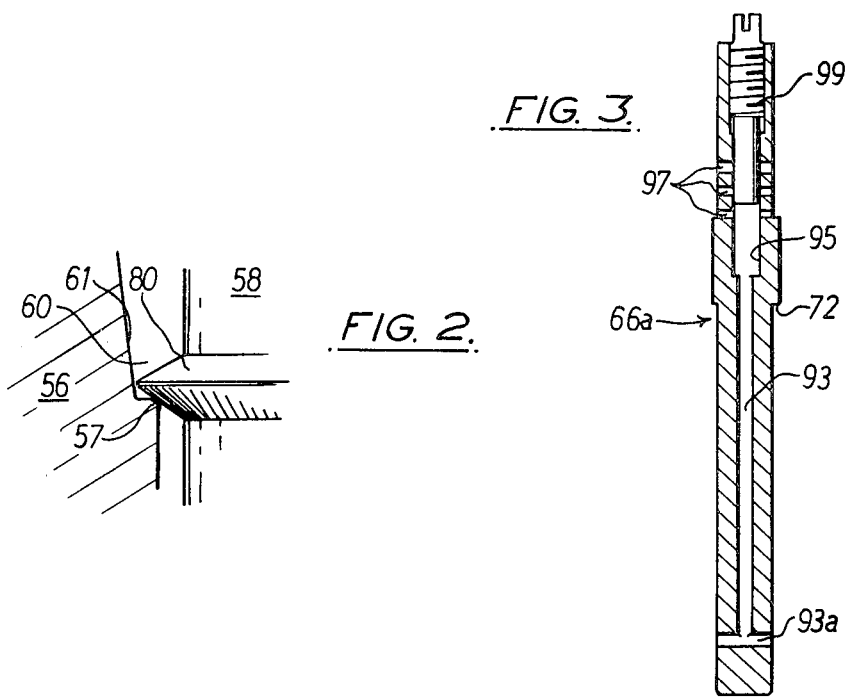
FIG. 3.
FIG. 2.

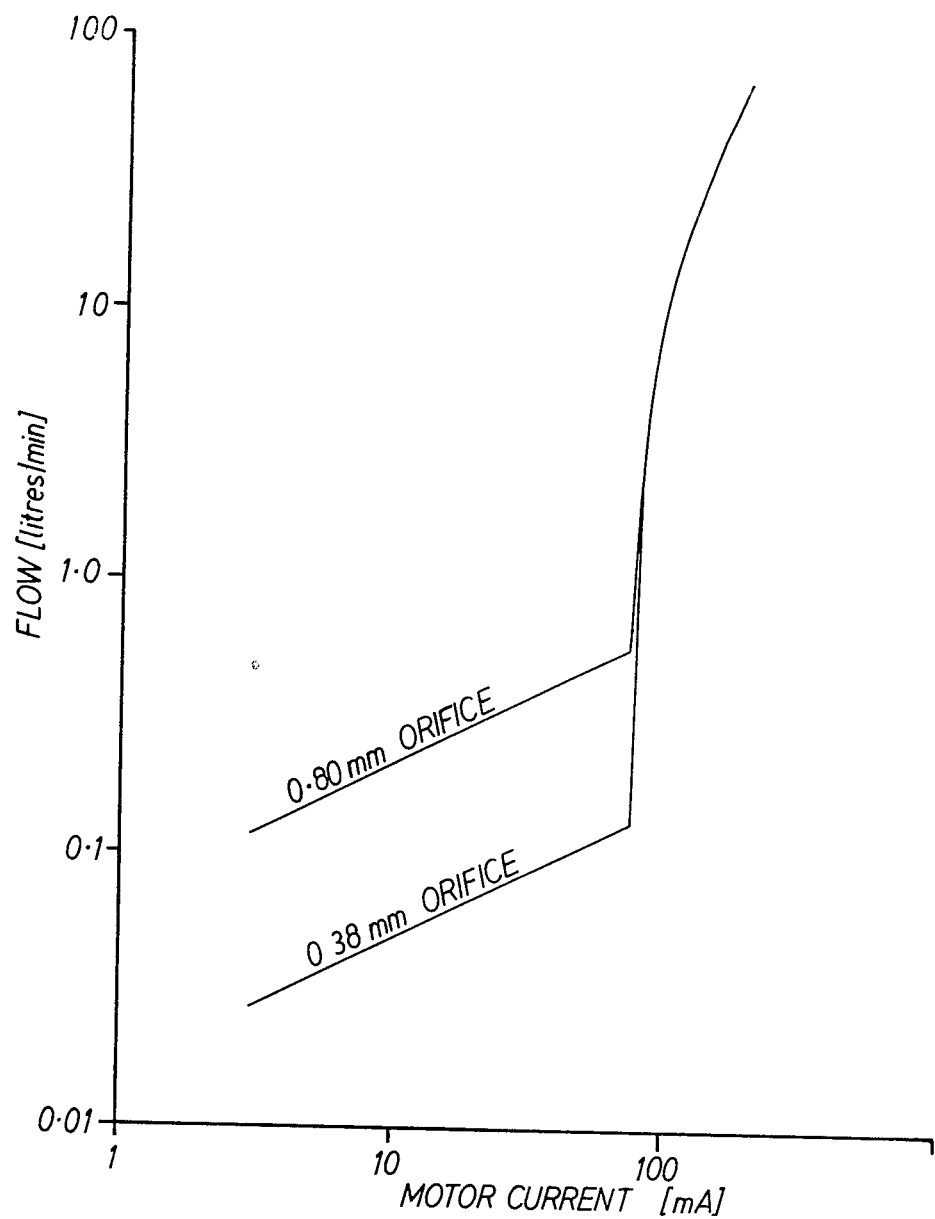

HYDRAULIC ACTUATOR CONTROLS

DESCRIPTION

The present invention relates to fluid flow sensors.

In our UK Pat. Specification No. 13 35 042 there is described a flow sensor having a very wide response range. The flow sensor has a housing with two flow ports by which the sensor can be connected in the hydraulic line, the flow through which is to be measured. A spool is movably disposed in a throat which interconnects two chambers with which the two flow ports respectively communicate. The spool is displaceable against a spring force by a pressure difference between the chambers from an obturating position in which fluid communication between the two chambers is substantially blocked. The throat is profiled so that, when the spool is displaced from is obturating position, an annular flow orifice of varyingflow cross section is defined between a sharp peripheral edge on the spool and the wall of the throat. The profiling of the throat is such that the pressure difference between the chambers is substantially proportional to the rate of fluid flow through the annular flow orifice. The housing has two auxiliary parts communicating respectively with the two chambers and the pressure difference appearing between these two auxiliary ports is used as a measure of the rate of fluid flow through the hydraulic line.

The flow sensor described in the above mentioned UK Pat. No. 13 35 042 can be readily designed to give a response range of 200:1. In such a case the maximum flow rate might be 400 l per min., giving a pressure difference of 10.6 K.p per cm$^2$. The minimum flow rate might be 2 l per min and no measurable response below this flow rate is achieved since manufacturing tolerances dictate that a radial clearance of 0.12 mm be provided between the sharp-edged rim of the spool and the wall of the throat when the spool is in its null or obturating position and since there will be a slight residual spring force acting on the spool, even when in this null position. The rate of fluid flow through a fixed orifice is approximately proportional to the square root of the pressure drop across such orifice. Thus, if the orifice is made sufficiently small to obtain a measurable pressure difference at the bottom end of the flow range, the pressure difference at the top end of the flow range would be prohibitively high. By using a variable orifice, as described in UK Pat. No. 13 35 042, this square law is "linearised", so substantially reducing the pressure difference at the top end of the flow range.

An object of the present invention is to provided a flow sensor in which the measurable range is further extended by providing improved response at the low flow rate end of the range.

According to the present invention, the movable spool is seated against a valve seat when in its obturating position and a bleed orifice is provided between the two chambers of the flow sensor.

The bleed orifice can be made to have a very much smaller flow cross section than the annular clearance between the rim edge of the spool and the narrowest part of the throat. By this means a very small fixed orifice can be used to obtain a measurable pressure difference at very low flow rates at which the pressure difference is insufficient to lift the spool from the valve seat against the residual spring force. At higher flow rates the spool is displaced by the pressure difference and the sensor operates in the same way as that of UK Pat. No. 1335042, and the flow through the orifice becomes insignificant.

The fixed orifice can be made sufficiently small for the sensor to produce a measurable pressure difference at a flow rate of as little as 15 cc per min., without reducing the maximum flow rate from 400 l per min. Thus the operating range is increased to 26 700:1.

The fixed orifice is fixed in the sense that it does not vary with the flow rate. It may be preadjustable to enable the flow sensor to be adjusted to meet individual requirements.

The invention is further described, by way of example, with reference to the accompanying drawings, in which:

FIG. 1 is a somewhat diagrammatic sectional view of a flow sensor according to the present invention;

FIG. 2 is a detail sectional view of part of the flow sensor, drawn to a very much larger scale;

FIG. 3 is a detail view to illustrate a modification; and

FIG. 4 is a graph drawn with logarithmic scales, showing the flow rate plotted as a function of the current fed to a force motor whose force opposes a feedback force produced by the fluid pressure difference obtained from the flow sensor.

FIG. 1 shows a flow sensor which can be used for example in a hydraulic actuator control system as described in our UK Pat. No. 1406326. The flow sensor is inserted in a supply line to a main control valve and the pressure difference across the flow sensor is fed back to a pilot valve where it produces a force opposing a force applied to the pilot valve by an electrical force motor.

The flow sensor comprises a housing 28 in which a hollow spool 58 is mounted so that it extends through an opening or throat 60 in an orifice plate 56. The spool 58 is slidably mounted on spring abutment washers 62 and 64 which are themselves mounted on a spindle 66. A spring 68 is disposed inside the hollow spool and acts between the washers 62 and 64 to urge then respectively against a pre-adjusted stop 70 and a fixed stop shoulder 72 on the spindle 66. Spring rings 74 and 76 in the ends of the spool 58 co-operate with the abutment washers 62 and 64 respectively.

The spool 58 includes a sharp-rimmed peripheral bead 80 which co-operates with the wall of the throat 60. The orifice plate 56 is, in contrast to the orifice plate of the flow sensor described in UK Pat. No. 1335042, provided with a fixed valve seat 57 (FIG. 2), against which the peripheral bead 80 of the spool 58 rests under the residual force of the spring 68. The spindle 66 is screw-threaded to a plug 86 in the housing 28 and can be turned by means of a screwdriver to adjust the residual spring force.

The orifice plate 56 and the spool 58 divide the interior of the housing 28 into two chambers 88 and 90 which are provided with main ports 92 and 94 by which the flow sensor is connected in the main flow line through which flows the hydraulic fluid whose flow rate is to be measured. Additionally each chamber 88,90 has a corresponding auxiliary or pressure port 96,98 which are connected by feedback lines and via a shuttle valve, if necessary, to respective pressure feedback chambers of the above-mentioned pilot valve.

The spool 58 has a small orifice 89 in its wall, placing the interior of the spool in restricted communication with the chamber 88. It also has a vent hole 91 in its wall placing the interior of the spool in substantially unrestricted communication with the chamber 90. So long as the bead 80 rests against the valve seat 57, substantially all of, the fluid flowing between the chambers 88 and 90 flows through the small orifice 89, leakage between the washer 62, the spool 58 and the spindle 66 being negligible as it is practical to provide close tolerance fits between these parts. The spool remains seated so long as the pressure difference between the chambers, acting on the spool 58 over the cross-sectional area of the valve seat 57 is insufficient to overcome the residual spring force. As shown as the fluid flow rate is high enough for the pressure drop across the small orifice 89 to be able to overcome the spring 68, the spool lifts off the seat 57 so that the fluid can now flow through a variable annular orifice defined between the sharp outer edge of the peripheral bead 80 and a profiled or contoured wall portion 61 of the throat 60 of the orifice plate 56.

The wall portion 61 is so profiled that the outer edge of the bead 80 is spaced therefrom by no more than about 0.12 mm, as required by manufacturing tolerance considerations, when the spool is in the closed or null position illustrated, and so that the variable annular orifice increases progressively as the spool lifts against the force of the spring 68. The profile of the wall portion 61 is preferably such that the pressure difference between the chambers 88 and 90 is substantially proportional to the rate of fluid flow through the variable annular orifice, as described in the above-mentioned UK Pat. No. 1335042. A response approaching a porportional response can be achieved by making the wall portion 61 of frusto-conical configuration, as shown.

The fixed orifice 89 between the chambers 88 and 90 is conveniently bored in the wall of the spool 58, as shown, as this makes it easy to accurately determine the size of the fixed orifice. However it could be drilled alternatively through the orifice plate 56 or it could be inserted in a by-pass passage between the chambers 88 and 90. A further possibility is to form a groove in the valve seat 57 or in the bead 80 so that the valve formed by the bead 80 and the seat 61 cannot close completely. The leakage path so formed thereby constitutes the fixed orifice.

A means for making the fixed orifice pre-adjustable is shown in FIG. 3. This figure shows a modified spindle 66a which has a longitudinal bore 93 connected by a transverse bore 93a to the chamber 88. The longitudinal bore 93 has an enlarged section 95 into which open several longitudinally spaced transverse orifice bores 97 communicating with the chamber 90. A plunger 99 is adjustably screwed into the enlarge bore section 95 to optionally close off one or more of the orifice bores 97, thereby enabling the total fixed orifice cross-sectional area to be pre-adjusted.

In the graph of FIG. 4 the flow through one particular sensor in liters per minute is plotted against the current in milliamps which must be supplied to the force motor to balance the feedback pressure differential derived from the flow sensor and applied to the pilot spool. It will be seen that the flow rate increases from 0.027 l per min., to 0.135 l per min., with a 0.38 mm diameter fixed orifice and from 0.115 l per min. to 0.59 l per min. with a 0.80 min. diameter fixed orifice when the motor current is increased from 3 ma to 76 ma before the spool commences to lift. Over this low end of the measurable flow range the pressure difference, and therefore the motor current is proportional to the square root of the flow rate. Because the graph is drawn with logarithmic scales, this part of the flow characteristic appears as a straight line for each fixed orifice size.

As soon as the spool begins to lift, the flow rate becomes approximately porportional to the motor current and increases to 84 l per min. for a maximum motor current of 200 ma. This part of the flow characteristic depends on the spring rate and the departure from a straight line in the logarithmic graph is due to the choice of a simple frusto-conical shape for the wall portion 61 rather than a complex curved shape by means of which the flow cross section of the variable annular orifice would be directly proportional to the displacement of the spool. As can be seen, the maximum flow rate which the particular sensor can handle in its described environment is 84 l per min. at a motor current of 200 a. In this particular embodiment the spring rate of the spring 68 is 37.5 kp per cm and the semi-cone angle of the wall section 61 is 3°. The maximum force produced by the force motor is approx. 4 Kp and is produced by the maximum motor current of 200 ma.

By making the fixed orifice still smaller the minimum controllable flow rate may be as little as 0.015 l per min. By using a softer spring and/or by making the spool of a larger diameter and/or by increasing the cone angle or divergence of the wall section 61 of the throat the maximum controllable flow rate can be increased to 400 l per min.

Thus the present invention recides in the appreciation that the flow range of a sensor of the kind described in our UK Patent No. 1335042 can be extended in a simple manner by providing a valve seat for the spool and a fixed by-pass orifice which is thereby rendered effective at low flow rates. Of course the provision of the valve seat 57 as illustrate renders the flow sensor responsive to flow in one direction only, but this does not matter if the flow sensor is in the supply line to or return line from the main valve, as illustrated in FIGS. 1 and 2 of our UK Patent No. 1406326. Bi-directional response, as is required when the flow sensor is connected in a service line as illustrated in FIG. 3 of UK Patent No. 1406326 can be achieved by utilising two flow sensors according to the invention connected in parallel but operative in opposite flow directions. If it is desired to cut out the effect of the fixed orifice of the sensor for the time being inoperative, a non-return valve can be connected in series with each sensor. However it is conceivable to arrange two spools in a common housing but opening from respective valve seats in opposite directions. It can be readily seen that in such an arrangement only one fixed orifice is necessary for the two spools.

I claim:

1. A fluid flow sensor comprising a housing having two flow ports by which the sensor can be connected in the hydraulic flow to be measured and having two chambers with which said ports respectively communicate and a throat interconnecting said chambers, a spool movably disposed in said throat, spring means acting on said spool, said spool having a peripheral edge co-operating with the wall of said throat and being displaceable from an obturating position against the force of said spring means by a pressure difference between the chambers, a valve seat in said housing, said spool being seated against said valve seat when in its obturating position, said throat being so profiled that a varying annular flow orifice is defined between said peripheral edge on the spool and the wall of the throat as the spool is displaced from its obturating position, whereby the pressure difference between said chambers provides a measure of the hydraulic flow between the flow ports; and bleed orifice means defining a residual flow path between said chambers when the spool is in its obturating position to obtain a measurable pressure difference at flow rates insufficient to lift the spool from the valve seat against residval spring forces.

2. A fluid flow sensor according to claim 1 in which the fixed valve seat is adjacent the throat and in which said spool has thereon a bead on which said peripheral edge co-operating with the wall of the throat is formed, said head abutting the valve seat in the obturating position.

3. A fluid flow sensor according to claim 1 or 2 in which said spool is hollow and said bleed orifice means comprises at least one orifice formed in the wall of the hollow spool.

4. A fluid flow sensor according to claim 1 or 2 including means for pre-adjusting said bleed orifice means.

5. A fluid flow sensor according to claim 4 including a spindle on which said spool is slidable and in which the bleed orifice means comprises several longitudinally spaced orifice bores formed transversely in the spindle and said pre-adjusting means comprises a plunger adjustably screwed longitudinally into the spindle from one end thereof and co-operating with one or more of said orifice bores.

* * * * *